United States Patent [19]

Carpenter

[11] Patent Number: 4,832,297
[45] Date of Patent: May 23, 1989

[54] DEVICE FOR INSTALLING AN ELECTRICAL OUTLET BOX

[75] Inventor: Jeffrey W. Carpenter, Sherman Oaks, Calif.

[73] Assignee: Sasco Energy, Cerritos, Calif.

[21] Appl. No.: 103,424

[22] Filed: Sep. 29, 1987

[51] Int. Cl.$^4$ ............................................. A47B 96/06
[52] U.S. Cl. ......................... 248/205.1; 248/DIG. 6
[58] Field of Search ............ 248/27.1, 205.1, DIG. 6, 248/146; 52/34, 35, 36, 317; 220/3.9; 174/63, 58

[56] References Cited

U.S. PATENT DOCUMENTS

| | | | |
|---|---|---|---|
| 1,675,921 | 7/1928 | Buchanan | 174/63 UX |
| 1,774,934 | 9/1930 | Mangin. | |
| 1,983,670 | 12/1934 | Knight | 247/21 |
| 2,032,636 | 3/1936 | Seckinger | 220/3.9 |
| 2,314,408 | 3/1943 | Knight | 72/16 |
| 2,316,389 | 4/1943 | Atkinson | 287/58 |
| 2,809,002 | 10/1957 | Rudolph | 248/205 |
| 2,990,172 | 6/1961 | Gianotta | 269/116 |
| 3,767,151 | 10/1973 | Seal | 174/58 X |
| 3,913,773 | 10/1975 | Copp et al. . | |
| 4,057,164 | 11/1977 | Maier | 174/58 X |
| 4,126,941 | 11/1978 | Clarke . | |
| 4,645,089 | 2/1987 | Horsley | 248/27.1 X |

FOREIGN PATENT DOCUMENTS 1311589 10/1962 France ..................... 174/58

*Primary Examiner*—J. Franklin Foss
*Attorney, Agent, or Firm*—Stephen L. King; Ronald W. Reagin

[57] ABSTRACT

An electrical outlet box installing device including a base portion having a preselected length and width, an upright member affixed to the base portion, the upright member being provided with an arrangement for mounting an electrical outlet box at a preselected height and abutting a first vertical wall, and an arrangement for positioning the upper portion of the upright member a preselected distance from a second vertical wall.

2 Claims, 1 Drawing Sheet

DEVICE FOR INSTALLING AN ELECTRICAL OUTLET BOX

BACKGROUND OF THE INVENTION

This invention relates to an installing device and, more particularly, to a device for installing electrical outlet boxes.

One of the most significant costs in the construction of office buildings is the cost of the labor used in the construction. The cost is especially large with respect to the labor of members of the skilled trades, such as electricians. For example, at present, the hourly rate for an electrician is approximately twenty-three dollars per hour. Consequently, reducing the number of hours spent by electricians in the construction of large office buildings significantly reduces the cost of such buildings.

For example, in an office building having a floor size of twenty thousand square feet, approximately one thousand electrical connection boxes of essentially the same type need to be placed at approximately the same position with respect to the floor of the building, the wall studs, and the surface of the walls. In order to reduce the time required by an electrician to install such an electrical outlet box, various jigs have been devised to hold a box in place during the installation. For example, U.S. Pat. No. 1,774,934 to J. Mangin; U.S. Pat. No. 1,983,670 to J. G. Knight; U.S. Pat. No. 2,314,408 to J. G. Knight; U.S. Pat. No. 2,316,389 to E. B. Atkinson; U.S. Pat. No. 2,809,002 to N. H. Rudolph; U.S. Pat. No. 3,913,773 to Copp et al; and U.S. Pat. No. 4,126,941 to J. E. Clarke all disclose various arrangements for holding an electrical outlet box while it is being installed. However, none of these prior patents discloses an arrangement which allows an electrician to position an outlet box rapidly with respect to all three dimensions; consequently, the cost of the labor attributable to electricians installing such boxes remains high.

SUMMARY OF THE INVENTION

It is an object of this invention to reduce the time necessary to install an electrician outlet box.

It is another object of this invention to provide an improved positioning device for electrical outlet boxes.

These and other objects of the invention are accomplished by an electrical outlet box installing device including a base portion having a prefixed length and width, an upright member affixed to the base portion at a distance from an edge thereof equal to the thickness of an electrical box to be installed, the upright member being provided with an arrangement for mounting an electrical outlet box at a height equal to the height at which the electrical box is to be mounted above the floor, and an extension to the upright member for positioning the upper portion of the upright member and a mounted electrical box at a preselected distance from a wall.

Other objects, features, and advantages of the invention will become apparent upon reference to the specification taken in conjunction with the drawings in which like elements are referred to by like reference characters throughout the several views.

DESCRIPTION OF THE PREFERRED EMBODIMENT

Figure 1:
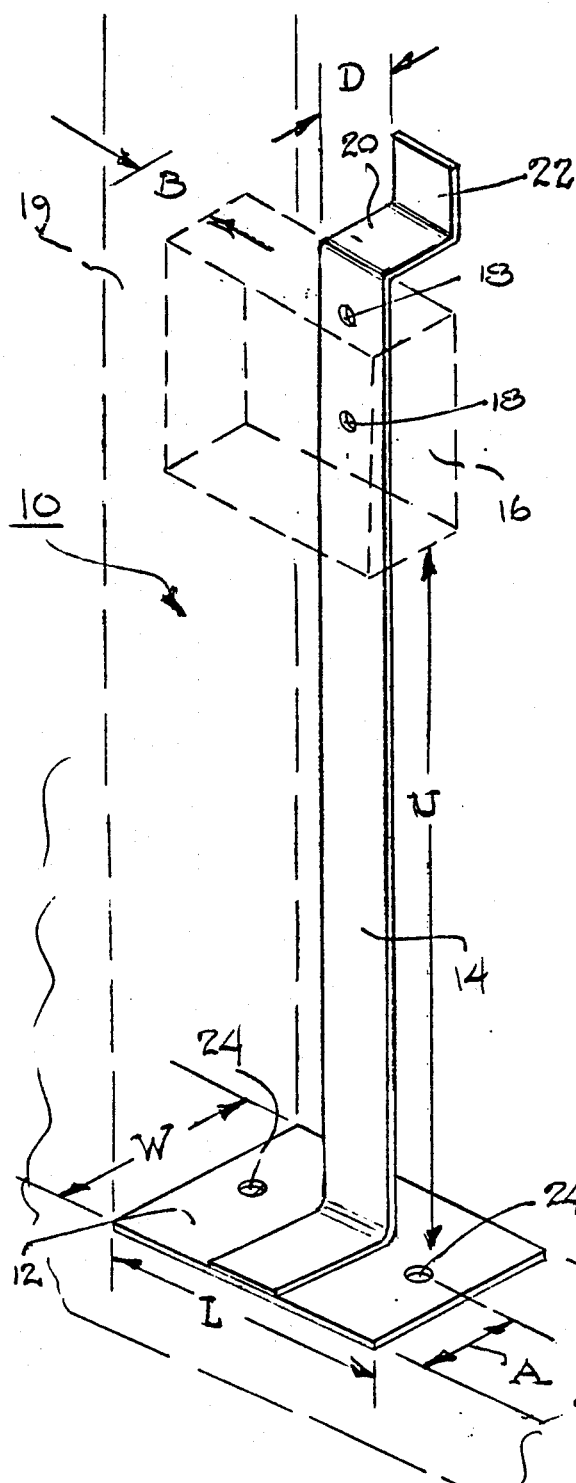
FIG. 1 is a perspective view of a device for installing an electrical outlet box constructed in accordance with the invention.

Referring now to FIG. 1 there is shown a perspective drawing of a device 10 which may be utilized in accordance with the present invention for installing electrical outlet boxes. The device 10 includes a base member 12 which, in the preferred embodiment, is rectangular in shape. The base member 12 has a width indicated by "W" in FIG. 1 such as to fit within the dimensions of the studs in a construction wall used in an industrial building. In a preferred embodiment, the dimension "W" is just less than the thickness of the studs so that the base member 12 fits snugly against the bottom board or bottom track 13 of the inner wall shown in FIG. 1.

Affixed to the base member 12 is an upright member 14 arranged at a distance "A" from the front edge (as seen in FIG. 1) of the base member 12. The distance "A" shown in FIG. 1 is selected to be precisely the depth of the particular standard electrical outlet box 16 with which the device 10 is associated. The base member 12 of the device 10 has a length "L" shown in FIG. 1 which is selected to position the upright member 14 so that the electrical outlet box 16 mounted thereto by mounting members 18 (such as screws or welds) and shown in phantom in FIG. 1 is positioned at a preselected distance B from a wall stud 19 (the side of which is shown in phantom in FIG. 1) against which the left end of the base member 12 is adapted to be placed. The position of the upright member 14 may be ascertained by determining the distance B or, alternatively, the distance which the center line of the electrical outlet box 16 should lie from a stud and equating that distance to the distance between the left edge of the base member 12 and the center line of the upright member 14.

The mounting members 18 are adapted to position the bottom the associated electrical outlet box 16 at a preselected distance C above the upper surface of the base member 12. The upright member 14 has a backwardly projecting arm 20 which extends a distance between the upright member 14 and the rear wall of the construction wall (not shown in FIG. 1 but lying in the plane including the rear edges of the stud 19 and the bottom track 13) so that the electrical outlet box 16 is precisely placed with respect to such rear wall. In a preferred embodiment of the invention, the extension 20 has a stop 22 affixed at right angles thereto to provide a broad surface abutting the rear wall.

In order to utilize the device 10, the electrical outlet box 16 is first installed to the device 10 by means of the mounting members 18. The device 10 is then positioned by placing the base 12 with its left edge between a vertical stud and its lower front edge against the interior base of the wall. The front edge of the base member 12 is thus positioned to lie in the same vertical plane as the front surface of the bottom track 13. The device 10 is affixed to the bottom track 13 by means of fasteners such as nails or screws at positions 24 shown in FIG. 1. This causes the electrical box 16 to be positioned an exact distance B from the vertical stud 19, an exact distance "A" behind the interior of the wall (not shown) and at an exact height C above the bottom track 13. When the rear wall sheathing is installed behind the projection 20, the rear of the electrical outlet box 16 is also exactly positioned with respect to that rear wall.

A preferred embodiment of the device 10 constructed in accordance with the present invention is constructed of 16 gauge thickness galvanized metal.

Figure 2:
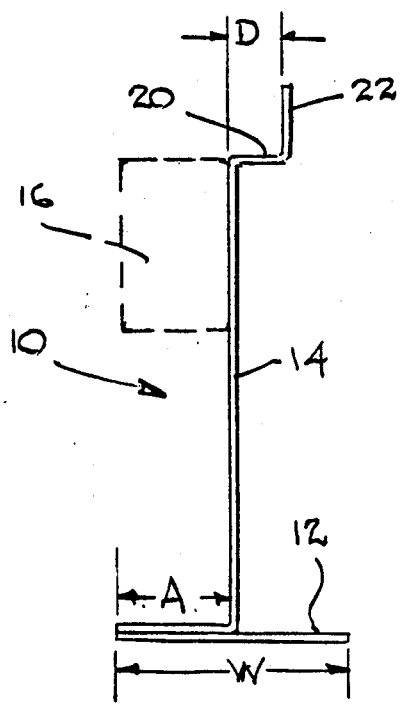
FIG. 2 is a side view of the invention shown in FIG. 1.
Figure 3:
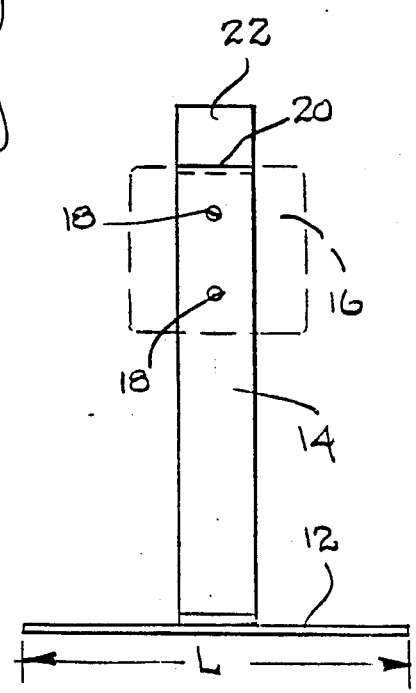
FIG. 3 is a front view of the invention shown in FIG. 1.

As may be seen in FIGS. 1, 2, and 3, the device 10 of the present invention allows rapid and accurate installation of an electrical outlet box in a time which is substantially reduced from that required for the installation of boxes in accordance with practices utilized in the prior art. Installing an electrical box 16 in accordance with the present invention using the device 10 takes on an average ten minutes whereas the prior art installation of electrical boxes using any of the devices known to the prior art averaged approximately fifteen. In general, the savings in installing a single floor of one thousand electrical boxes amounts to eighty-three hours. At the present hourly rates of electricians, this amounts to approximatly two thousand dollars per floor.

As will be understood by those skilled in the art, various arrangements other than those described in detail in the specification will occur to those persons skilled in the art which arrangements lie within the spirit and scope of the invention. For example, the device may be utilized for positioning other than electrical outlet boxes (such as fuse boxes) within the walls of a building. It is therefore to be understood that the invention is to be limited only by the claims appended hereto.

What is claimed is:

1. An electrical outlet box installing device comprising a base portion having a preselected length and width, an upright member affixed to the base portion, the upright member being provided with an arrangement for mounting an electrical outlet box at a preselected height and abutting a first vertical wall, and means, comprised of an extension of said upright member, separated by a substantial distance from the base portion for positioning the upper portion of the upright member a preselected distance from a second vertical wall.

2. An electrical outlet box installing device as claimed in claim 1 in which the arrangement for mounting an electrical outlet box is selected to position the box in a preselected position with respect to all edges of the base.

* * * * *